(12) United States Patent
Gossett (10) Patent No.: US 7,453,921 B1
(45) Date of Patent: Nov. 18, 2008

(54) LPC FILTER FOR REMOVING PERIODIC AND QUASI-PERIODIC INTERFERENCE FROM SPREAD SPECTRUM SIGNALS

(75) Inventor: Carroll Philip Gossett, Mountain View, CA (US)

(73) Assignee: Google Inc., Mountain View, CA (US)

(*) Notice: Subject to any disclaimer, the term of this patent is extended or adjusted under 35 U.S.C. 154(b) by 917 days.

(21) Appl. No.: 10/015,013

(22) Filed: Dec. 11, 2001

(51) Int. Cl.
  *H04B 1/707* (2006.01)
  *H04B 1/10* (2006.01)

(52) U.S. Cl. ..................... 375/147; 375/350

(58) Field of Classification Search ........... 375/132, 375/140, 144, 148, 152, 147, 130, 136, 350, 375/232, 233, 316, 346; 370/340, 290; 379/406.08, 379/406.09; 708/318, 322, 323, 426
See application file for complete search history.

(56) References Cited

U.S. PATENT DOCUMENTS

| | | | | |
|---|---|---|---|---|
| 4,358,844 A | | 11/1982 | Pirani | 370/18 |
| 4,578,676 A | * | 3/1986 | Harrison, Jr. | 343/17.1 R |
| 5,268,927 A | | 12/1993 | Dimos et al. | |
| 5,410,568 A | | 4/1995 | Schilling | |
| 5,623,485 A | | 4/1997 | Bi | 370/209 |
| 5,646,964 A | | 7/1997 | Ushirokawa et al. | 375/346 |
| 5,649,299 A | * | 7/1997 | Battin et al. | 455/62 |
| 5,677,929 A | | 10/1997 | Asano et al. | 375/206 |
| 5,687,191 A | * | 11/1997 | Lee et al. | 375/216 |
| 5,691,974 A | | 11/1997 | Zehavi et al. | 370/203 |
| 5,715,236 A | | 2/1998 | Gilhousen et al. | 370/290 |
| 5,729,465 A | * | 3/1998 | Barbaresco | 364/485 |
| 5,742,694 A | * | 4/1998 | Eatwell | 381/94.2 |
| 5,809,061 A | | 9/1998 | Shea et al. | 375/206 |
| 5,822,360 A | * | 10/1998 | Lee et al. | 375/200 |
| 5,825,807 A | | 10/1998 | Kumar | 375/200 |

(Continued)

FOREIGN PATENT DOCUMENTS

CN  1301090 A  6/2001

(Continued)

OTHER PUBLICATIONS

F. Takavira, "Adaptive Lattice Filters for Narrowband Interference Rejection in DS Spread Spectrum Systems", Proceedings of the 1994 IEEE South African Symposium on Communications and Signal Processing, 1994, COMSIG-94, Oct. 4, 1994, pp. 1-5.*

(Continued)

*Primary Examiner*—Young T. Tse
(74) *Attorney, Agent, or Firm*—Fish & Richardson P.C.

(57) ABSTRACT

A spread spectrum system having data transmitted in a spread spectrum signal. Periodic and quasi-periodic signals which act as interference in the spectrum of interest is effectively filtered out by using a linear predictive coding filter. The LPC filter takes a digitized received spread spectrum signal and generates a set of predictive coefficients and a set of error coefficients. The predictive coefficients represent the interfering periodic and/or quasi-periodic signals. As such, the set of predictive coefficients are discarded. The remaining error coefficients represent what is left over and thereby contains the useful transmitted data found within the spread spectrum signal. The error coefficients are used by the signal processing block to extract the transmitted data.

15 Claims, 6 Drawing Sheets

U.S. PATENT DOCUMENTS

| | | | |
|---|---|---|---|
| 5,864,548 A | 1/1999 | Liu | 370/320 |
| 5,872,540 A | 2/1999 | Casabona et al. | |
| 5,940,429 A | 8/1999 | Lam et al. | 375/200 |
| 5,940,791 A * | 8/1999 | Byrnes et al. | 704/219 |
| 5,995,923 A * | 11/1999 | Mermelstein et al. | 704/219 |
| 6,005,891 A | 12/1999 | Chadwick et al. | 375/224 |
| 6,009,118 A * | 12/1999 | Tiemann et al. | 375/150 |
| 6,009,129 A * | 12/1999 | Kenney et al. | 375/346 |
| 6,072,822 A * | 6/2000 | Naruse et al. | 375/147 |
| 6,091,725 A | 7/2000 | Cheriton et al. | |
| 6,091,760 A | 7/2000 | Giallorenzi et al. | 375/140 |
| 6,128,332 A | 10/2000 | Fukawa et al. | 375/146 |
| 6,169,912 B1 | 1/2001 | Zuckerman | 455/570 |
| 6,185,246 B1 | 2/2001 | Gilhousen | 375/200 |
| 6,185,426 B1 | 2/2001 | Alperovich et al. | 455/456 |
| 6,211,828 B1 | 4/2001 | Krylov et al. | 343/702 |
| 6,229,478 B1 | 5/2001 | Biacs et al. | 342/357.03 |
| 6,249,760 B1 * | 6/2001 | Bossemeyer, Jr. | 704/225 |
| 6,256,609 B1 * | 7/2001 | Byrnes et al. | 704/246 |
| 6,370,183 B1 * | 4/2002 | Newson et al. | 375/144 |
| 6,393,047 B1 | 5/2002 | Popovic' | |
| 6,411,645 B1 | 6/2002 | Lee et al. | 375/140 |
| 6,418,147 B1 * | 7/2002 | Wiedeman | 370/468 |
| 6,426,977 B1 * | 7/2002 | Lee et al. | 375/259 |
| 6,449,305 B1 | 9/2002 | Menich et al. | 375/141 |
| 6,463,089 B1 | 10/2002 | Chauncey et al. | 375/131 |
| 6,496,474 B1 | 12/2002 | Nagatani et al. | 370/208 |
| 6,501,733 B1 | 12/2002 | Falco | |
| 6,507,573 B1 | 1/2003 | Lukanek et al. | 370/335 |
| 6,522,656 B1 | 2/2003 | Gridley | 370/428 |
| 6,535,544 B1 * | 3/2003 | Partyka | 375/132 |
| 6,563,793 B1 | 5/2003 | Golden et al. | |
| 6,611,519 B1 | 8/2003 | Howe | |
| 6,611,600 B1 * | 8/2003 | Leber et al. | 381/66 |
| 6,621,796 B1 | 9/2003 | Miklos | |
| 6,640,209 B1 * | 10/2003 | Das | 704/219 |
| 6,665,825 B1 | 12/2003 | Mobin et al. | 714/700 |
| 6,675,125 B2 | 1/2004 | Bizjak | |
| 6,678,341 B1 * | 1/2004 | Miyake et al. | 375/356 |
| 6,691,092 B1 * | 2/2004 | Udaya Bhaskar et al. | 704/265 |
| 6,754,282 B1 | 6/2004 | Ross et al. | |
| 6,826,241 B2 | 11/2004 | Kahana | |
| 6,970,681 B2 * | 11/2005 | Darabi et al. | 455/73 |
| 7,050,545 B2 * | 5/2006 | Tanrikulu et al. | 379/406.08 |
| 7,103,026 B2 | 9/2006 | Hall et al. | |
| 2001/0033616 A1 * | 10/2001 | Rijnberg et al. | 375/232 |
| 2002/0106004 A1 | 8/2002 | Tan | 375/140 |
| 2002/0118728 A1 | 8/2002 | Mohseni et al. | |
| 2002/0172180 A1 | 11/2002 | Hall et al. | 370/342 |
| 2002/0191566 A1 | 12/2002 | Fogel | |
| 2003/0009325 A1 * | 1/2003 | Kirchherr et al. | 704/211 |
| 2003/0138031 A1 | 7/2003 | Okubo et al. | |
| 2003/0161339 A1 | 8/2003 | Oishi et al. | |
| 2003/0185286 A1 * | 10/2003 | Yuen | 375/152 |
| 2004/0095990 A1 * | 5/2004 | Gossett et al. | 375/148 |
| 2004/0267860 A1 | 12/2004 | Agami et al. | |
| 2006/0062284 A1 * | 3/2006 | Li et al. | 375/148 |
| 2006/0251261 A1 * | 11/2006 | Christoph | 381/1 |

FOREIGN PATENT DOCUMENTS

| | | | |
|---|---|---|---|
| EP | 0588598 | 3/1994 | |
| EP | 0940947 | 9/1999 | |
| EP | 1047215 | 10/2000 | |
| GB | 2022954 | 12/1979 | |
| GB | 2276794 | 10/1997 | |
| WO | WO00/01091 | 1/2000 | 7/216 |
| WO | WO00/01092 | 1/2000 | 7/216 |
| WO | WO 00/11838 | 3/2000 | |

OTHER PUBLICATIONS

Zeidler et al., "Frequency Tracking Performance of Adaptive Lattice Filters", Conference Record of the Twenty-Fifth Asilomar Conference on Signals, Systems and Computers, 1991, Nov. 4-6, 1991, vol. 2, pp. 643-649.*

Keiler et al., "Efficient Linear Prediction for Digital Audio Effects", Proceedings of the Cost G-6 Conference on Digital Audio Effects (DAFX-00), Verona, Italy, Dec. 7-9, 2000, pp. 1-6.*

Tianren et al., "Vector Quantization Based upon Bandpass Filtering Applied to Speech Recognition", 9$^{th}$ International Conference on Pattern Recognition, IEEE 1998, Nov. 14-17, 1998, vol. 2, pp. 1091-1093.*

Harry Newton, "Newton's Telecom Dictionary", ISBN# 1-57820-069-5, Malk Kelsey Published, Feb. 2001, pp. 96-97.*

Harry Newton, "Newton's Telecom Dictionary", ISBN# 1-57820-069-5, Malk Kelsey Published, Feb. 2001, pp. 17.*

Harry Newton, "Newton's Telecom Dictionary", ISBN# 1-57820-069-5, Malk Kelsey Published, Feb. 2001, pp. 523.*

Bernardini, et al. "Linear Prediction Methods for Interference Elimination in Spread Spectrum Systems" European Transactions on Telecommunications and Related Technologies, AEI Milano, IT, vol. 1, 1, No. 1, 1990, pp. 67-78, XP000170707 ISSN: 1120-3862 Paragraphs 0003, 0004; Figure 6.

J.J. Shynk; "On Lattice-form algorithms for adaptive IIR filtering" 1988 IEEE International Conference on Acoustics, Speech, and Signal Processing, vol. 3, Apr. 11-14, 1988, pp. 1554-1557, XP002236570 paragraphs "Adaptive lattice realization" "Gauss-Newton Adaptive algorithms" Figure 1.

Shan P, et al. "FM interference Suppression in Spread Spectrum Communications Using Time-Varying Autoregressive Model Based Instantaneous Frequency Estimation" 1999 IEEE International conference on Acoustics, speech and signal processing (ICASSP) New Your NY IEEE US vol. 5, Mar. 15, 1999 pp. 2559-2562 XP000932374 ISBN: 0-7803-5042-1 Abstract paragraphs 0002, 0003, figure 1.

Rodriguez-Fonollosa J, et al. "A new process for adaptive IIR filtering based on the lod-area-ratio parameters" Signal processing 5: Theories and applications proceedings of eusipco-90 fifth European signal processing conference Barcelona, Sep. 18-21, 1990 Proceedings of the European signal processing conference (EUSIPCO) Amsterdam, Elsevier NL vol. 1. CONF 5, Sep. 18, 1990 pp. 257-260 XP000358086 ISBN: 0-444-88636-2 Paragraphs 0002, 0003.

Database WPI Section EI, Week 200247 Derwent Publications Ltd. London, GB; AN 2002-441855 XP002246945 & KR 2002 002 034 A (Geosystems Inc.) Jan. 9, 2002.

Devalla b., et al. "Adaptive connection admission control for mission critical real-time communication networks," Military Communication Conference, 1998 MILCOM 98, Proceedings, IEEE Boston, MA Oct. 18-21, 1998 NY, NY pp. 614-620.

Lenstra, et al., "Analysis of Bernstein's Factorization Circuit," Advances in Cryptology—ASIACRYPT 2002, 8$^{th}$ Int'l Conference on the Theory and Application of Cryptology and Information Security, Queenstown, New Zealand, Dec. 1-5, 2002, 26 pages.

Roche, C., et al., "Performance of congestion control mechanisms in wormhole routing networks," INFOCOM '97, Sixteen Annual Joint Conference of the IEEE Computer and Communications Societies, driving the Information Revolution, Proceedings IEEE Kobe, Japan, Apr. 7-11, 1997, Los Alamitos, CA pp. 1365-1372.

* cited by examiner

LPC FILTER FOR REMOVING PERIODIC AND QUASI-PERIODIC INTERFERENCE FROM SPREAD SPECTRUM SIGNALS

FIELD OF THE INVENTION

The present invention relates to using a linear predictive coding filter for the purpose of removing periodic and/or quasi-periodic interference from spread spectrum signals.

BACKGROUND OF THE INVENTION

Wireless communications have emerged to become a huge market as millions of people world-wide buy cellular handsets, subscribe to Personal Communications Services (PCS), and make calls on a daily basis. There are many competing technologies in the wireless communications field. Initially, cellular transmissions were made according to traditional analog radio frequency (RF) technology. But as wireless digital technology improved, it became clear that digital applications were far superior to that of analog. The three dominant wireless digital technologies existing today include Global System of Mobile communications (GSM), Time Division Multiple Access (TDMA), and Code Division Multiple Access (CDMA). Of these three digital wireless technologies, CDMA is gaining widespread popularity because of its many advantages.

Generally, CDMA offers greater signal quality, resulting in clearer calls. In addition, CDMA utilizes a spread-spectrum approach, which essentially entails spreading the signal out across a wider spectrum. Consequently, the overall power of the transmitted signal can be boosted without exceeding the FCC regulations in any one channel. This makes it ideal for deployment in dense urban areas where multi-pathing is an issue. In turn, this results in fewer dropped calls. Furthermore, CDMA technology is more power efficient, thereby prolonging the standby and active battery life. But one of the most attractive features of CDMA is that it offers a greater capacity for carrying signals. Basically, the airwaves are divided into a number of different frequency bands per Federal Communications Commission (FCC) regulations. A limited segment of the airwaves has been allocated by the FCC for cellular usage. Due to the huge demand for cellular usage and the limited bandwidth that is available, getting a license from the FCC to transmit on a particular frequency band is extremely expensive. By increasing capacity, CDMA enables PCS providers to carry more users per channel. This increased capacity directly translates into greater revenue for cellular companies.

The advantages of CDMA carry over into high-speed wireless digital access. Increasingly, wireless digital applications are being used to access digital data (e.g., the Internet, intranet, multimedia, business data, etc.) at high speeds. With high speed wireless access, mobile users can obtain instant access to the Internet, business data (e.g., stock market quotes, sales reports, inventory information, price checks, customer data, emails, pages, etc.), and other real time data (e.g., traffic updates, weather information, sports news, etc.). The goal is to provide cellular handsets, personal digital assistants, portable communications devices, etc. the ability to transmit and receive digital data as well as make conventional telephone calls. The trend is towards ever faster mobile data speeds to meet customer demands. With greater data speeds, it is possible to provide even more data to more users. Recent CDMA based standards such as IS-95 and 3G are proposing increased data rates and capabilities. Other emerging standards include IEEE 802.11(b) which utilizes a direct sequence spread spectrum technique and "Bluetooth" which utilizes a frequency hopping spread spectrum technique.

Unfortunately, spreading the signal out across a wide spectrum subjects that signal to a greater degree of interfering signals found within that spectrum. Whereas digital filters can be used to effectively notch out all the known, fixed interference being broadcast in designated restricted bands, it is virtually impossible to accurately quantify and then effectively notch out each of the huge host of variable interfering signals in the various non-restricted bands. The aggregate effect from all of the various interference sources dramatically reduces the range of a spread spectrum signal. Furthermore, the interference significantly reduces the rate by which data can be transmitted using a spread spectrum technique.

Thus, there is a need in the prior art for a method or apparatus which could somehow eliminate most if not all of the interference so as to effectively increase the range and rate by which spread spectrum signals may be transmitted and received.

SUMMARY OF THE INVENTION

The present invention pertains to an apparatus and method for using a linear predictive coding filter for the purpose of removing periodic and/or quasi-periodic interference from spread spectrum signals. Data is encoded and transmitted as a spread spectrum signal. Periodic and quasi-periodic signals which act as interference in the spectrum of interest are effectively filtered out by using a linear predictive coding filter. The LPC filter takes a digitized received spread spectrum signal and generates a set of predictive coefficients and a set of error coefficients. The predictive coefficients represent the interfering periodic and/or quasi-periodic signals. As such, this set of predictive coefficients are discarded. The remaining error coefficients represent what is left over and thereby contain the useful transmitted data found within the spread spectrum signal. The error coefficients are used by the signal processing block to extract the transmitted data. By implementing the LPC filter in such a novel and unique way, the present invention dramatically improves the range and data rate by which spread spectrum systems may operate.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for using a linear predictive coding filter for the purpose of removing periodic and/or quasi-periodic interference from spread spectrum signals is disclosed. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
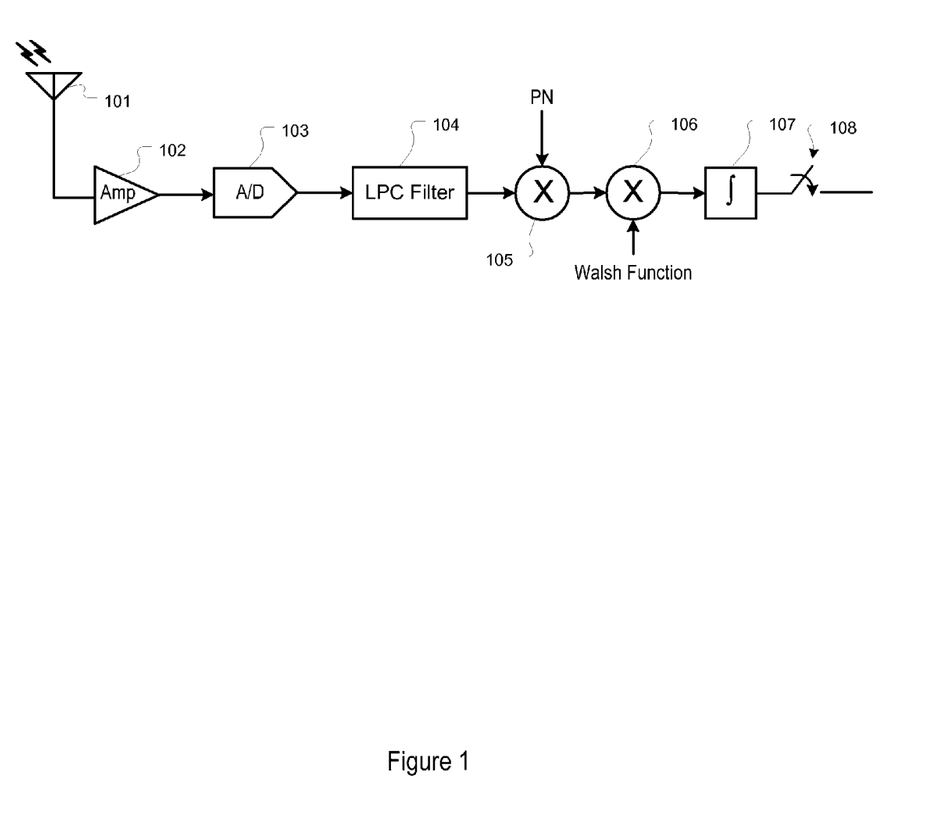
FIG. 1 shows an exemplary baseband direct sequence, spread spectrum CDMA receiver upon which the present invention may be practiced.

FIG. 1 shows an exemplary baseband direct sequence, spread spectrum CDMA receiver upon which the present invention may be practiced. The CDMA receiver uses Walsh functions and a separate pseudo-random code. The RF signal is received over antenna 101. The signal is then amplified by an amplifier 102. In the currently preferred embodiment, amplifier 102 is comprised of two or more baseband video amplifiers coupled in series. This can provide a gain bandwidth product in the Terahertz range. Next, the analog signal is converted into an equivalent digital signal by an analog-to-digital converter 103. A linear predictive coding filter 104 is then used to filter out the periodic and quasi-periodic interference in the spectrum of interest. Thereupon, the signal is demodulated by multiplying it with the synchronized pseudo-random number 105. This is the same pseudo-random number associated with the transmitting base station. The signal is multiplied by a synchronized Walsh function 106 in order to eliminate interference due to other users' transmission within that cell. An integration 107 is followed by a sample and hold 108 function. Optionally, a bandpass filter is used to filter out the AM radio signals (e.g., 0.5 MHz to 1.5 MHz). Furthermore, a high pass filter may used to filter out the higher frequencies (e.g., above 30 MHz). Alternatively, notch filter(s) may be used to filter out the known interference signal(s) in the restricted bands.

It should be noted that the present invention works with any type of spread spectrum technique and at any frequency. The present invention can be implemented for cell phone, data transfers, peer-to-peer communications, satellite, military, commercial, civilian, IEEE 802.11(b), Bluetooth, as well as a wide range of different wireless transmissions schemes, formats, and medium. One such spread spectrum system is described in detail in the patent application entitled, "A Baseband Direct Sequence Spread Spectrum Transceiver," filed Jan. 26, 2001, Ser. No. 09/772,110, now U.S. Pat. No. 6,982,945, and which is incorporated by reference in its entirety herein. Another spread spectrum system is described in the patent application entitled, "Application of a Pseudo-Randomly Shuffled Hadamard Function In A Wireless CDMA System," filed Dec. 5, 2000, Ser. No. 09/730,697, now U.S. Pat. No. 6,829,289, and which is incorporated by reference in its entirety herein.

In the currently preferred embodiment of the present invention, a linear predictive coding (LPC) filter is used to filter out periodic and quasi-periodic signals in the band of interest. LPC type filters are well known in the art. (See, for example, L. R. Rabiner and R. W. Schafer, *Digital Processing of Speech Signals*; N. Morgan and B. Gold, *Speech and Audio Signal Processing: Processing and Perception of Speech and Music*; J. R. Deller, J. G. Proakis, and J. H. L. Hansen, *Discrete-Time Processing of Speech Signals*; S. Furui, *Digital Speech Processing, Synthesis and Recognition*; D. O'Shaughnessy, *Speech Communications: Human and Machine*; A. J. Rubio Ayuso and J. M. Lopez Soler, *Speech Recognition and Coding: New Advances and Trends*; M. R. Schroeder, *Computer Speech: Recognition, Compression, Synthesis*; B. S. Atal, V. Cuperman, and A. Gersho, *Speech and Audio Coding for Wireless and Network Applications*; B. S. Atal, V. Cuperman, and A. Gersho, *Advances in Speech Coding*; D. G. Childers, *Speech Processing and Synthesis Toolboxe*; R. Goldberg and L. Rick, *A Practical Handbook of Speech Coders*.)

Figure 2:
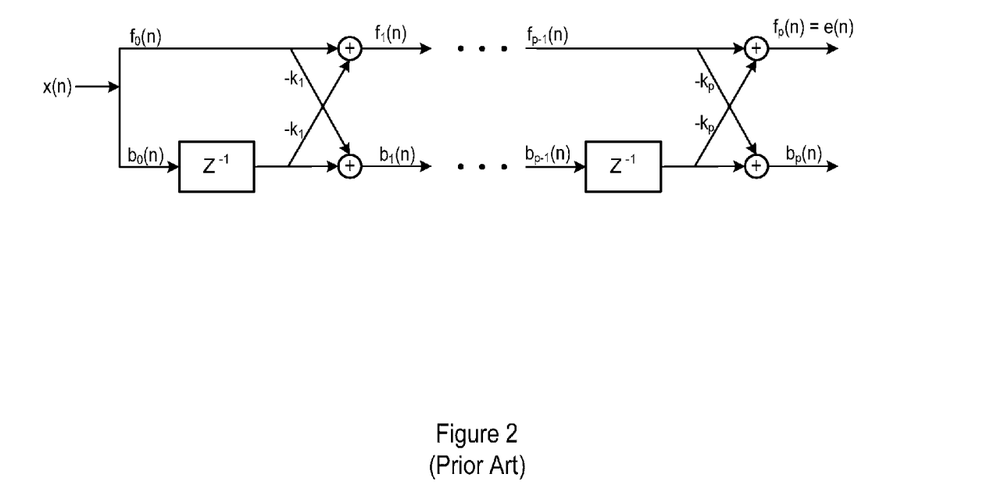
FIG. 2 shows an exemplary circuit diagram of a linear predictive coding (LPC) filter having a gradient adaptive lattice structure.

They are found in many audio applications for the coding of audio and/or speech signals. In the prior art, the purpose for LPC filters is to determine linear predictive terms which are critical in modeling speech. FIG. 2 shows an exemplary circuit diagram of a linear predictive coding (LPC) filter having a gradient adaptive lattice structure. The LPC filter of FIG. 2 is described in detail in the publication by Florian Keiler, Daniel Arfib, and Udo Zolzer, "Efficient Linear Prediction For Digital Audio Effects," Proceedings of the COST G-6 Conference on Digital Audio Effects (DAFX-00), Verona, Italy, Dec. 7-9, 2000.

According to the publication, in LPC, the current input sample x(n) is approximated by a linear combination of past samples of the input signal. The prediction of x(n) is computed using an FIR filter by $$\hat{x}(n) = \sum_{k=1}^{p} a_k x(n-k)$$

where p is the prediction order and $a_k$ are the prediction coefficients. With the z-transform of the prediction filter $$P(z) = \sum_{k=1}^{p} a_k z^{-k}$$

the difference between the original input signal x(n) and its prediction $\hat{x}(n)$ is evaluated in the z-domain by $$e(z)=X(z)-\hat{X}(z)=X(z)[1-P(z)]=X(z)A(z).$$

Figure 3:
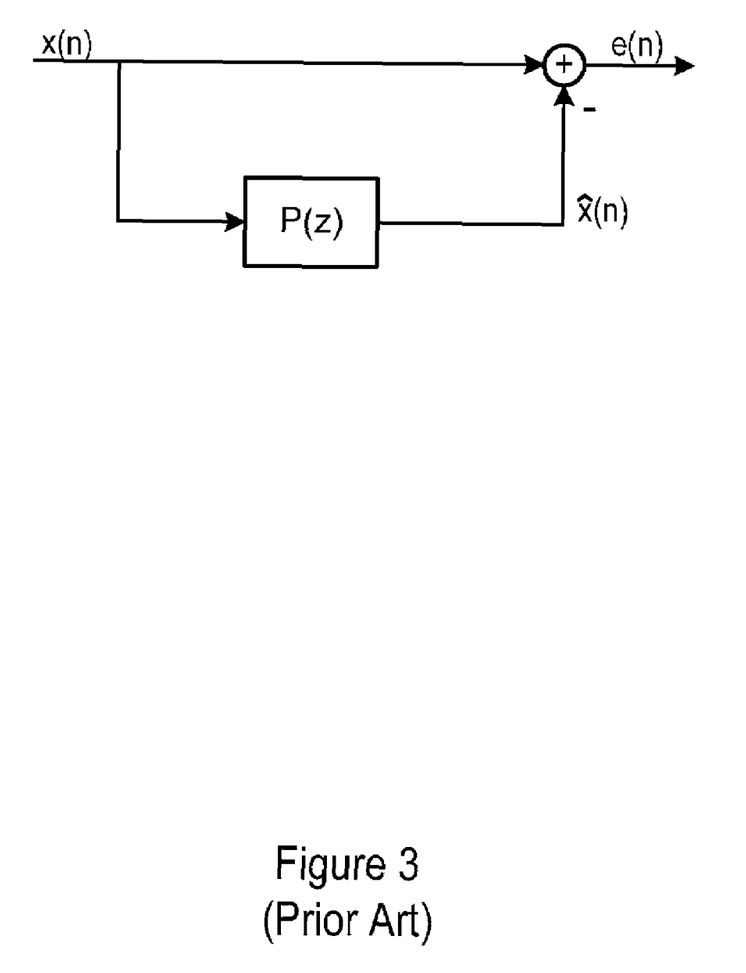
FIG. 3 shows how the difference signal e(n) or prediction error is calculated.

The difference signal e(n) is called residual or prediction error and its calculation is depicted in FIG. 3. Here the feed-forward prediction is considered where the prediction is calculated in the forward direction from the input signal.

Figure 4:
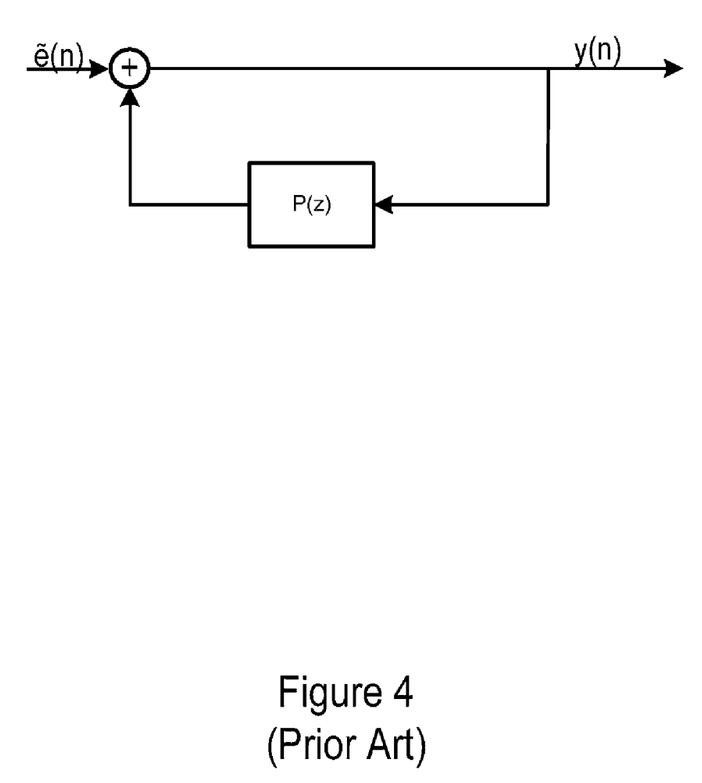
FIG. 4 shows a feedback loop with a FIR filter.

Using the excitation ~e(n) as input to the all-pole filter $$H(z) = \frac{1}{1-P(z)}$$

produces the output signal $$Y(z)=\tilde{E}(z) \cdot H(z)$$

where H(z) can be realized with the FIR filter P(z) in a feedback loop as shown in FIG. 4. If the residual e(n) calculated in the analysis stage is fed directly into the synthesis filter, the input signal x(n) will be ideally recovered.

The IIR filter H(z) is termed a synthesis filter or LPC filter and it models—except for a gain factor—the input signal X(z). For speech coding this filter models the time-varying vocal tract. The filter A(z)=1−H(z) for calculating the residual from the input signal is called the inverse filter.

With optimal filter coefficients, the residual energy is minimized. This can be exploited for efficient coding of the input signal where the quantized residual ~e(n)=Q {e(n)} is used as excitation to the LPC filter. Three commonly used linear prediction methods (autocorrelation method, Burg algorithm, and gradient adaptive lattice) are presented to get methods which are suited for real-time computation, i.e. to get a similar workload each sample. We consider here linear prediction methods for a computation of the residual with zero delay. Thus, the prediction coefficients are computed from past samples of the input signal and the methods are suited for audio coding using the ADPCM structure where no transmission of the filter coefficients is required. The fast filter update coming from the similar workload of each sample leads to better spectral models than block-based approaches where the coefficients are held constant for the duration of one block. With a fast update of the spectral model no interpolation of the filter coefficients between frames is required.

The prediction error can be calculated by a standard FIR structure which requires the direct FIR coefficients $a_k$. In the lattice structure of FIG. 2, the signals $f_m(n)$ and $b_m(n)$ are used which are the forward and backward prediction errors of an m-th order predictor. Forward prediction means the prediction is based on past samples while in backward prediction, a sample is predicted from future samples. In the lattice methods, the lattice or PARCOR (partial correlation) coefficients $k_j$ are calculated instead of the direct FIR coefficients. Although it is possible to calculate the direct coefficients from the lattice ones, sometimes it is useful to perform the filter operation in the lattice structure. The main advantage of the lattice coefficients is that the stability of the LPC filter is guaranteed for $|k_i|<1$. Furthermore, if a predictor of order m−1 is already known, for a predictor of order m only the coefficient $k_m$ has to be calculated. For the direct FIR coefficients normally the complete coefficient set has to be changed in this case.

In case of using the lattice structure, the lattice states $b_i(n)$ have to be recalculated if the lattice coefficients $k_i$ are changed. This problem does not occur in the direct FIR structure since the filter states are equal to past samples of the input signal and they are independent of the used coefficient set.

Some methods to calculate the prediction coefficients for minimizing the residual energy are now described. First, the standard block-based approaches of the Burg Algorithm and the autocorrelation method are summarized. Then the sample based gradient adaptive lattice (GAL) method is described. Finally, modifications of the block-based methods for a sample-based calculation in a real-time system is described.

The Burg algorithm is based on the lattice structure and it minimizes for a predictor of order m in a block of length N the sum of the energies of the forward prediction error $f_m(n)$ and of the backward prediction error $b_m(n)$.

The initialization of the forward and backward prediction errors of order zero for the considered block is obtained by $$f_0(n)=x(n), n=0,\ldots,N-1$$

$$b_0(n)=x(n), n=0,\ldots,N-1$$

where n denotes the time index in the considered block. For m=1, ..., p the following operations are performed:
Calculation of the m-th lattice coefficient $$k_m = \frac{2\sum_{n=m}^{N-1}[f_{m-1}(n)b_{m-1}(n-1)]}{\sum_{n=m}^{N-1}[f_{m-1}^2(n)+b_{m-1}^2(n-1)]}$$

Recursive calculation of the forward and backward prediction errors of order m:

$$f_m = f_{m-1}(n) - k_m b_{m-1}(n-1),$$

$$n=m+1,\ldots,N-1$$

$$b_m(n)=b_{m-1}(n-1)-k_m f_{m-1}(n),$$

$$n=m,\ldots,N-1$$

The autocorrelation method minimizes the prediction error e(n), or in terms of the lattice structure, the forward prediction error. For a block of length N an approximation of the autocorrelation sequence is calculated by $$R(i) = \frac{1}{N}\sum_{n=i}^{N-1} u(n)u(n-i)$$

where $u(n)=x(n)*w(n)$ is a windowed version of the considered block $x(n)$, $n=0,\ldots,N-1$. Normally, a Hamming window is used. For a predictor of order p the filter coefficients $a_i$ for $i=1,\ldots,p$ are obtained by solving the normal equations $$\sum_{k=1}^{p} a_k R(i-k) = R(i), i=1,\ldots,p.$$

An efficient solution of the normal equations is performed by the Levinson-Durbin recursion. First the energy of the predictor of order zero is initialized to $E\,0=R(0)$. Afterwards the following operations are performed for $m=1,\ldots,p$, where ak(m) denotes the k-th coefficient of an m-th order predictor.

$$k_m = \frac{R(m) - \sum_{k=1}^{m-1} a_k^{(m-1)} R(m-k)}{E_{m-1}}$$

$$a_m^{(m)} = k_m$$

$$a_k^{(m)} = a_k^{(m-1)} - k_m a_{m-k}^{(m-1)}, k = 1, \ldots, m-1$$

$$E_m = (1-k_m^2)E_{m-1}$$

As in the block-based Burg algorithm, in the gradient adaptive lattice method the lattice coefficients are used and the sum of the forward and backward prediction errors is minimized. Using the approximation of the error energy of the m-th order predictor $$\hat{J}_m(n) = f_m^2(n) + b_m^2(n)$$

yields with the steepest decent approach the coefficient update $$k_m(n+1) = k_m(n) - \mu_m \frac{\partial \hat{J}_m(n)}{\partial k_m(n)}$$

with the gradient weights m. Applying the recursions for the current time index n leads to $$\frac{\partial \hat{J}_m(n)}{\partial k_m(n)} = -2[f_m(n)b_{m-1}(n-1) + b_m(n)f_{m-1}(n)]$$

This gives a formula for a sample-by-sample update of the lattice coefficients.

The simplest approach is to choose the $\mu_m$ values constant. Simulations have shown that the optimum value of $\mu$ (equal for all orders for simplicity) depends highly on the used signals, the optimum value varies approximately in the range from 1 to 10. Better results are expected for gradient weights which are adaptively dependent on the expectation value of the sum of the forward and backward prediction error energies. An approximation of this expectation value can be recursively calculated by $$D_m(n) = \lambda D_m(n-1) + [f_{m-1}^2(n) + b_{m-1}^2(n-1)]$$

where $0 < \lambda < 1$ influences the weight of older samples. The gradient weights are obtained by $$2\mu_m = \frac{\alpha}{D_m(n)}$$

with a constant value $\alpha$ which is normally chosen to $\alpha = 1 - \lambda$ for a recursive formulation of the Burg algorithm.

Both the autocorrelation method and the Burg algorithm require first an initialization process before the prediction coefficients are computed recursively. The real-time computation of a coefficient set of order p is spread over p+1 samples; one sample for the initialization and one sample each for the p coefficients. Thus, with the counter i=0, 1, . . . , p, 0, 1, . . . (changing every sample) we get the following procedure:

For i=0 perform the initialization

For i∈{1,p} calculate the coefficient with index i.

In the initialization process (i=0) the operations are performed for setting both the forward and backward prediction error of order zero to the input samples x(n) in the considered block. For i=1, . . . , p one coefficient $k_i$ is calculated and applying the recursions of order m=i, the forward and backward prediction errors of i-th order are computed which are required in the following sample for computing $k_{i+1}$. The new $k_i$ replaces the previously used $k_i$. Since one coefficient is changed, a recalculation of the lattice states prior to the filter operation is required.

In the Levinson-Durbin recursion the autocorrelation sequence R(i) for i=0, . . . , p is required. In the initialization process (i=0) first the input data block is windowed, where normally a Hamming window is used; then R(0) is computed. For i∈{1; p} the value R(i) is computed followed by the Durbin recursion of order m=i. Thus, the calculation of the complete set of the direct FIR coefficients $a_k^{(p)}$ of order p requires p+1 samples. If the standard FIR structure is used, the use of the coefficients in the filter operation has to be delayed by p+1 samples.

Table 1 shows the maximum workloads per sample for calculating the filter coefficients, i.e. the filter operations to calculate the prediction are not considered. In the GAL the prediction order p has the greatest influence on the complexity. In this method for each sample p divisions are required which are very expensive on a DSP (but division is no required if $\mu$ is fixed). Note that in the Burg algorithm the maximum workload is only influenced by the block length N which is also the case in the autocorrelation method for long blocks.

TABLE 1

Maximum workload per sample for coefficient calculation.

| Method | DSP instructions |
| --- | --- |
| suc. Autocorrelation | Max {4N+55,3N+5p+172} |
| suc. Burg | 9N+72 |
| GAL | 90p+1 |

In the example given above, it can be seen that the resulting linear predictive terms are given by $k_m$. In the prior art, the $k_m$ terms are used to model speech. However, note that there are resulting error terms, $e(n) = f_p(n)$ and $b_p(n)$, which are also generated as an output from the LPC filter. In the prior art, these error terms are simply discarded and not used in any way. However, in the present invention, the error term is kept whereas the linear predictive terms are discarded. In other words, the $e(n) = f_p(n)$, $b_p(n)$ signals (or any linear combination thereof) are passed on through the receiver, while the $k_m$ signal is discarded.

Figure 5:
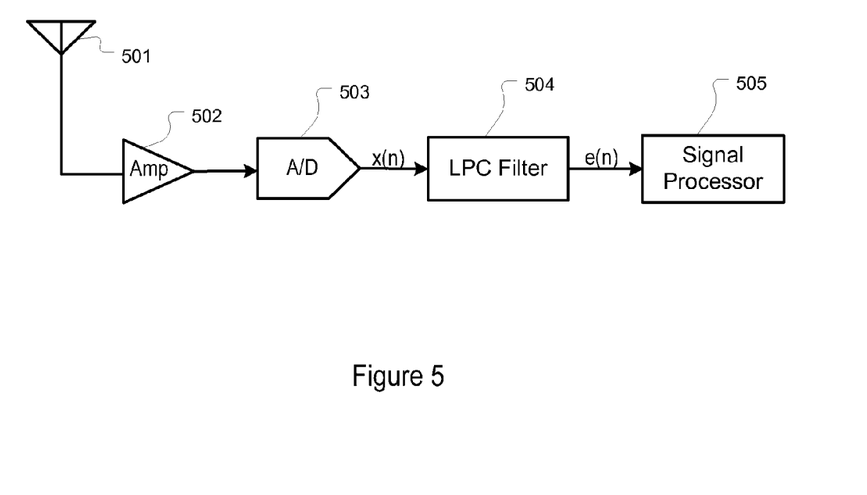
FIG. 5 is a block diagram showing how the LPC filter is used in the present invention.

FIG. 5 is a block diagram showing how the LPC filter is used in the present invention. The spread spectrum signal is received by antenna 501. The received signal is then amplified by amplifier or pre-amp 502. The received signal is then digitized by an analog-to-digital (A/D) converter 503. The digital signal is then fed as an input to an LPC filter 504. The error term coming out of the LPC filter 504 is used for further processing by the receiver's signal processor block 505. The linear predictive terms generated by the LPC filter 504 contains the periodic and quasi-periodic signals. These periodic and quasi-periodic signals are actually interference with respect to the spread spectrum signal. As such, these linear predictive terms are intentionally discarded by the present invention, thereby effectively filtering out the interference. Instead, the "error" term, which contains everything except the periodic and quasi-periodic signals, is used by the rest of receiver's signal processing system. Note that the sequence length of the spread spectrum signal should be significantly longer than the order of the lattice. Since the spread spectrum signal is not seen as periodic or quasi-periodic by the lattice, it is unaffected by the lattice; while the periodic and quasi-periodic interference is removed. Thereby, the present invention entails using an LPC filter in a novel and hitherto unconventional way to effectively remove everything in the band of interest which is periodic or quasi-periodic in nature.

Figure 6:
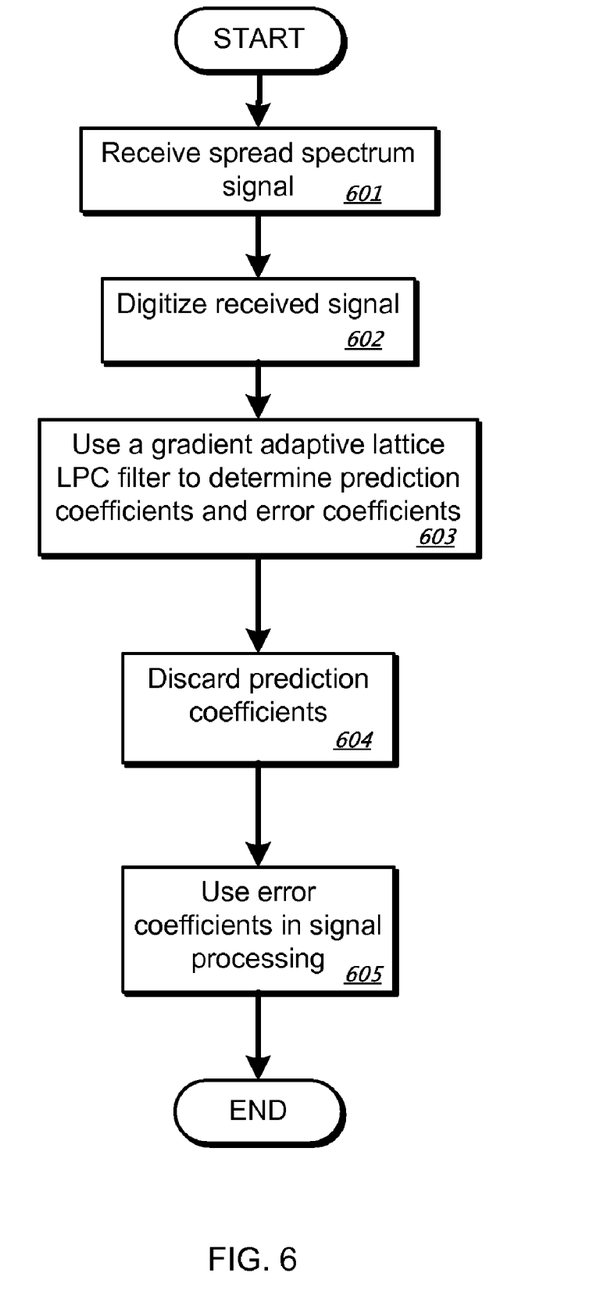
FIG. 6 is a flowchart describing the steps of implementing an LPC filter to filter out periodic and/or quasi-periodic signals in a spread spectrum signal.

FIG. 6 is a flowchart describing the steps of implementing an LPC filter to filter out periodic and/or quasi-periodic signals in a spread spectrum signal. Initially, a spread spectrum signal is received, step 601. This received spread spectrum signal is then digitized, step 602. In step 603, a gradient adaptive lattice LPC filter takes this digitized spread spectrum signal and generates a set of prediction coefficients and a set of error coefficients. The set of prediction coefficients corresponds to periodic and quasi-periodic (if any) signals found in the received spread spectrum signal. These periodic and quasi-periodic signals represent "interference" with respect to the data contained within the spread spectrum system. As such, the prediction coefficients are discarded. The information left over is represented in the error coefficients. This contains the useful data contained in the spread spectrum signal which was transmitted by a corresponding spread spectrum transmitter. Consequently, the error coefficients are used by the signal processor to recover the useful data, step 605.

It should be noted that the present invention can be applied to any modulation scheme, either wireless or hard-wired, which utilizes a spread-spectrum technique. In particular, the present invention can be applied to CDMA cellular handsets as well as other wireless mobile CDMA devices or appliances. Furthermore, the present invention can be expeditiously applied to peer-to-peer wireless applications, especially for peer-to-peer cellular voice and/or data communications. The present invention can be applied to increase the range and/or data rates of existing spread spectrum techniques, including but not limited to CDMA, IEEE 802.11(b), Bluetooth, 3G, etc. One such system upon which the present invention may be practiced is described in the patent application entitled, "A Communications Network Quality Of Service System And Method For Real Time Information," filed Dec. 12, 2000, Ser. No. 09/738,010, now U.S. Pat. No. 7,142,536, which is incorporated by reference in its entirety herein. In addition, the present invention works with any type of filter which has the property of discriminating periodic and/or quasi-periodic signals, including but not limited to LPC filters, adaptive gradient lattice filters, etc.

Therefore, a linear predictive coding filter for the purpose of removing periodic and/or quasi-periodic interference from spread spectrum signals is disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A signal filtering method, comprising:
   receiving a spread spectrum signal that comprises a transmitted data component and a periodic and/or quasi-periodic interference component;
   digitizing said received spread spectrum signal;
   determining linear predictive coefficients and error coefficients corresponding to said digitized spread spectrum signal;
   providing said error coefficients to a synthesis filter; and
   recovering, with said synthesis filter, said transmitted data component in said received spread spectrum signal, based on said provided error coefficients, and not based on said linear predictive coefficients, such that the periodic and/or quasi-periodic interference component is substantially filtered out.

2. The method of claim 1, wherein determining said linear predictive coefficients and said error coefficients comprises employing a linear predictive coding filter to determine said linear predictive coefficients and said error coefficients.

3. The method of claim 1, wherein said spread spectrum signal complies with IEEE 802.11(b).

4. The method of claim 1, wherein said spread spectrum signal complies with Bluetooth specifications.

5. The method of claim 1, wherein said spread spectrum signal comprises a CDMA signal.

6. A method for filtering out periodic and/or quasi-periodic interference from a spread spectrum signal that comprises a transmitted data component and a periodic and/or quasi-periodic interference component, the method comprising:
   receiving said spread spectrum signal;
   digitizing said received spread spectrum signal;
   using a linear predictive coding filter having a gradient adaptive lattice structure to determine linear predictive coefficients and error coefficients corresponding to said digitized spread spectrum signal;
   providing said error coefficients to a synthesis filter; and
   employing said synthesis filter to recover said transmitted data component from said received spread spectrum signal, based on said error coefficients and not based on said linear predictive coefficients, such that the periodic and/or quasi-periodic interference component is substantially filtered out.

7. A signal filtering method, comprising:
   receiving a spread spectrum signal, the spread spectrum signal comprising a transmitted data component and a periodic and/or quasi-periodic interference component;
   digitizing the received spread spectrum signal;
   determining, using a linear predictive coding filter, linear predictive coefficients and error coefficients corresponding to the digitized spread spectrum signal;
   providing the error coefficients to a synthesis filter; and
   employing the synthesis filter to recover the transmitted data component from the received spread spectrum signal, based on the provided error coefficients and not based on the linear predictive coefficients, such that the periodic and/or quasi-periodic interference component is substantially filtered out.

8. A receiver comprising:
   antenna circuitry for receiving a spread spectrum signal that comprises a transmitted data component and a periodic and/or quasi-periodic interference component;
   an analog-to-digital converter configured to digitize the spread spectrum signal received by the antenna circuitry; and
   processing circuitry that is configured to a) determine linear predictive coefficients and error coefficients corresponding to the digitized spread spectrum signal; b) provide the error coefficients to a synthesis filter; and c) recover, with the synthesis filter, the transmitted data component in the digitized spread spectrum signal, based on the provided error coefficients, and not based on the linear predictive coefficients, such that the periodic and/or quasi-periodic interference component is substantially filtered out.

9. The receiver of claim 8, wherein the processing circuitry comprises a linear predictive coding filter that determines the linear predictive coefficients and the error coefficients.

10. The receiver of claim 8, wherein the spread spectrum signal complies with IEEE 802.11(b).

11. The receiver of claim 8, wherein the spread spectrum signal complies with Bluetooth specifications.

12. The receiver of claim 8, wherein the antenna circuitry is configured to receive a CDMA spread spectrum signal.

13. The receiver of claim 8, wherein the antenna circuitry is configured to receive a direct-sequence spread spectrum signal.

14. The receiver of claim 8, wherein the antenna circuitry is configured to receive a frequency-hopping spread spectrum signal.

15. The receiver of claim 8, wherein the processing circuitry is configured to filter out the periodic and/or quasi-periodic interference component from the received spread spectrum signal.

* * * * *